US012265968B1

(12) United States Patent
Gittino et al.

(10) Patent No.: US 12,265,968 B1
(45) Date of Patent: Apr. 1, 2025

(54) DETECTING UNDESIRABLE ACTIVITY BASED ON MATCHING PARAMETERS OF GROUPS OF NODES IN GRAPHICAL REPRESENTATIONS

(71) Applicant: Citigroup Technology, Inc., Weehawken, NJ (US)

(72) Inventors: Paola Gittino, Riverview, FL (US); William George Cormier, Clearwater, FL (US); Steve Thomas Dayton, Brandon, FL (US); Miriam Silver, Tel Aviv (IL)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

(21) Appl. No.: 18/668,087

(22) Filed: May 17, 2024

Related U.S. Application Data

(63) Continuation-in-part of application No. 18/379,405, filed on Oct. 12, 2023, now Pat. No. 12,147,986,
(Continued)

(51) Int. Cl.
*G06Q 40/00* (2023.01)
*G06Q 20/40* (2012.01)

(52) U.S. Cl.
CPC ..... *G06Q 20/4016* (2013.01); *G06Q 20/4014* (2013.01)

(58) Field of Classification Search
CPC ........................ G06Q 20/4016; G06Q 20/4014
See application file for complete search history.

(56) References Cited

U.S. PATENT DOCUMENTS 6,714,936 B1 * 3/2004 Nevin, III ........... G06F 16/9024
703/2
7,165,105 B2 1/2007 Reiner et al.
(Continued)

FOREIGN PATENT DOCUMENTS

WO WO-2018032097 A1 * 2/2018 ......... G06Q 20/4016
WO 2021086794 A1 5/2021

OTHER PUBLICATIONS

Tarashima et al., "Keypoint Matching for Non-Rigid Object via Locally Consistent Visual Pattern Mining," IP.COM Digital Object Identifier: 10.1109/ICIP.2018.8451016, 2018 (Year: 2018).*
(Continued)

*Primary Examiner* — Abhishek Vyas
*Assistant Examiner* — William B. Bunker
(74) *Attorney, Agent, or Firm* — Perkins Coie LLP

(57) ABSTRACT

Methods and systems are described herein for identifying matching parameters of groups of nodes in graphical representations. The system may generate, in a graphical user interface, a graphical representation of nodes representing users associated with an entity. The system may activate the graphical representation as links connecting pairs of nodes, with the links representing interactions between users. The system may identify a grouping of nodes having a level of local clustering indicative of undesired activity. The system may determine graphical parameters relating to the level of local clustering and may identify the same graphical parameters in other groupings of nodes in other graphical representations. The system may thus identify indications of undesired activity based on matching parameters of groups of nodes.

20 Claims, 12 Drawing Sheets

Related U.S. Application Data which is a continuation-in-part of application No. 14/707,852, filed on May 8, 2015, now abandoned.

(60) Provisional application No. 62/079,110, filed on Nov. 13, 2014.

(56) References Cited

U.S. PATENT DOCUMENTS

| | | |
|---|---|---|
| 8,306,889 B2 | 11/2012 | Leibon et al. |
| 11,380,171 B2 | 7/2022 | Chen et al. |
| 2004/0199792 A1* | 10/2004 | Tan ............... H04L 41/0893 726/12 |
| 2013/0046842 A1* | 2/2013 | Muntz .............. G06Q 10/00 709/206 |
| 2014/0278479 A1* | 9/2014 | Wang .............. G06Q 10/10 705/2 |
| 2014/0344230 A1* | 11/2014 | Krause ............ G06F 16/9024 707/723 |
| 2015/0089424 A1* | 3/2015 | Duffield ............ G06F 3/0484 715/771 |
| 2016/0117778 A1 | 4/2016 | Costello et al. |
| 2016/0180557 A1* | 6/2016 | Yousaf ............... G06F 21/50 715/762 |
| 2016/0344758 A1* | 11/2016 | Cohen ............... H04L 63/145 |
| 2018/0095621 A1* | 4/2018 | Ryan ............... G06F 3/04842 |
| 2023/0237493 A1* | 7/2023 | Gu ................. G06Q 40/02 705/44 |
| 2024/0146761 A1* | 5/2024 | Singh ............... G06F 16/285 |

OTHER PUBLICATIONS

Rikard Teodorsson, "A Guide for application design and performance reporting of data streaming applications," Chalmers University of Technology, University of Gothenburg, 2021 (Year: 2021).*
Anonymous, "Top Community Detection Algorithms Compared," Dgraph Labs, Inc., 2024 (Year: 2024).*
Wikipedia, "Clustering Coefficient," 2024 (Year: 2024).*
International Search Report and Written Opinion issued in International Application No. PCT/US2024/047856 on Dec. 24, 2024 (8 pages).

* cited by examiner

| Month | Number of Entities | Number of Connections | Community of Interest | Number of Community Entities | Number of Community Connections | Number of Assortativity by Customer Type | Number of Assortativity by SAR History | Density | Clustering | Direct Acyclic Graph |
|---|---|---|---|---|---|---|---|---|---|---|
| OCT | 88 | 36 | 1 | 4 | 3 | -50 | -100 | 0.5 | 0 | TRUE |
| DEC | 86 | 52 | 1 | 4 | 3 | -50 | -100 | 0.5 | 0 | TRUE |

*Identical Values*

ONE OR MORE PROCESSORS COUPLED TO MEMORY GENERATE, IN A RELATIONSHIP VISUALIZATION ASPECT OF A GRAPHICAL USER INTERFACE, A VISUALIZATION CONSISTING AT LEAST IN PART OF A PLURALITY OF ICONS, EACH ICON REPRESENTING A TRANSACTING ENTITY.

S2

THE ONE OR MORE PROCESSORS ACTIVATE, ALSO IN THE RELATIONSHIP VISUALIZATION ASPECT OF THE GRAPHICAL USER INTERFACE, A VISUALIZATION CONSISTING AT LEAST IN PART OF AN ELEMENT DISPOSED BETWEEN EACH OF A PLURALITY OF PAIRS OF SAID PLURALITY OF ICONS REPRESENTING TRANSACTIONS BETWEEN TRANSACTING ENTITIES.

S3

THE ONE OR MORE PROCESSORS ENCAPSULATE, LIKEWISE IN THE RELATIONSHIP VISUALIZATION ASPECT OF THE GRAPHICAL USER INTERFACE, A VISUALIZATION OF AT LEAST ONE COMMUNITY OF ICONS CONSISTING OF AT LEAST A PORTION OF SAID PLURALITY OF PAIRS OF ICONS, AT LEAST ONE MEMBER OF SAID COMMUNITY OF ICONS REPRESENTING A TRANSACTING ENTITY HAVING A HISTORY OF ANOMALOUS TRANSACTIONS.

FIG. 12

DETECTING UNDESIRABLE ACTIVITY BASED ON MATCHING PARAMETERS OF GROUPS OF NODES IN GRAPHICAL REPRESENTATIONS

This application is a continuation-in-part of U.S. patent application Ser. No. 18/379,405 filed Oct. 12, 2023, which is a continuation-in-part of U.S. patent application Ser. No. 14/707,852, filed May 8, 2015, which claims the benefit under 35 U.S.C. § 119(e) of U.S. Provisional Application No. 62/079,110, filed Nov. 13, 2014. The content of the foregoing application is incorporated herein in its entirety by reference.

SUMMARY

Methods and systems described herein may identify matching parameters of groups of nodes in graphical representations. The system may generate, in a graphical user interface, a graphical representation of nodes representing users associated with an entity. The system may activate the graphical representation as links connecting pairs of nodes, with the links representing interactions between users. The system may identify a grouping of nodes having a level of local clustering indicative of undesired activity. The system may determine graphical parameters relating to the level of local clustering and may identify the same graphical parameters in other groupings of nodes in other graphical representations. The system may thus identify indications of undesired activity based on matching parameters of groups of nodes.

In some embodiments, the system may generate, in a graphical user interface, a graphical representation of encoded data. The encoded data may include parameters of users associated with an entity (e.g., an organization). In some embodiments, the parameters may relate to user risk, user history, user type, and user interactions. The users may have both direct and indirect connections to one another. Some users may have prior anomalous interactions while others may not. The graphical representation may include nodes corresponding to the users, and the nodes may include corresponding encoded data parameters of the users. The graphical representation may include links connecting pairs of the nodes. In some embodiments, the links may represent interactions between the users.

The system may identify a level of local clustering for each grouping of nodes. For example, the level of local clustering may be based on a ratio of a first number of first links to a second number of second links. The first links may connect pairs of nodes within the grouping to at least one user of the grouping with prior anomalous interactions. The second links may include a maximum possible number of links connecting the pairs within the grouping to one another. In some embodiments, the ratio may measure the level of clustering around the user having prior anomalous interactions.

The system may detect a particular grouping having a level of local clustering that satisfies a predetermined level of local clustering. For example, the predetermined level of local clustering may be indicative of undesired activity. The system may determine, for a portion of the graphical representation corresponding to the particular grouping, certain graphical parameters relating to the corresponding level of local clustering.

The system may then identify, within a different graphical representation, a different grouping having the same graphical parameters matching the first grouping. For example, the system may identify matching parameters in a different grouping of nodes representing different users. The system may thus identify indications of undesired activity based on matching parameters of groups of nodes.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 10 is a table that illustrates an example of a similar pattern found in data for two separate months for a case employing network analysis and visualization according to embodiments of the invention;

FIG. 12 is a flow chart that illustrates an overview example of the graphical user interface electronic data visualization process for embodiments of the invention.

DETAILED DESCRIPTION

Figure 1:
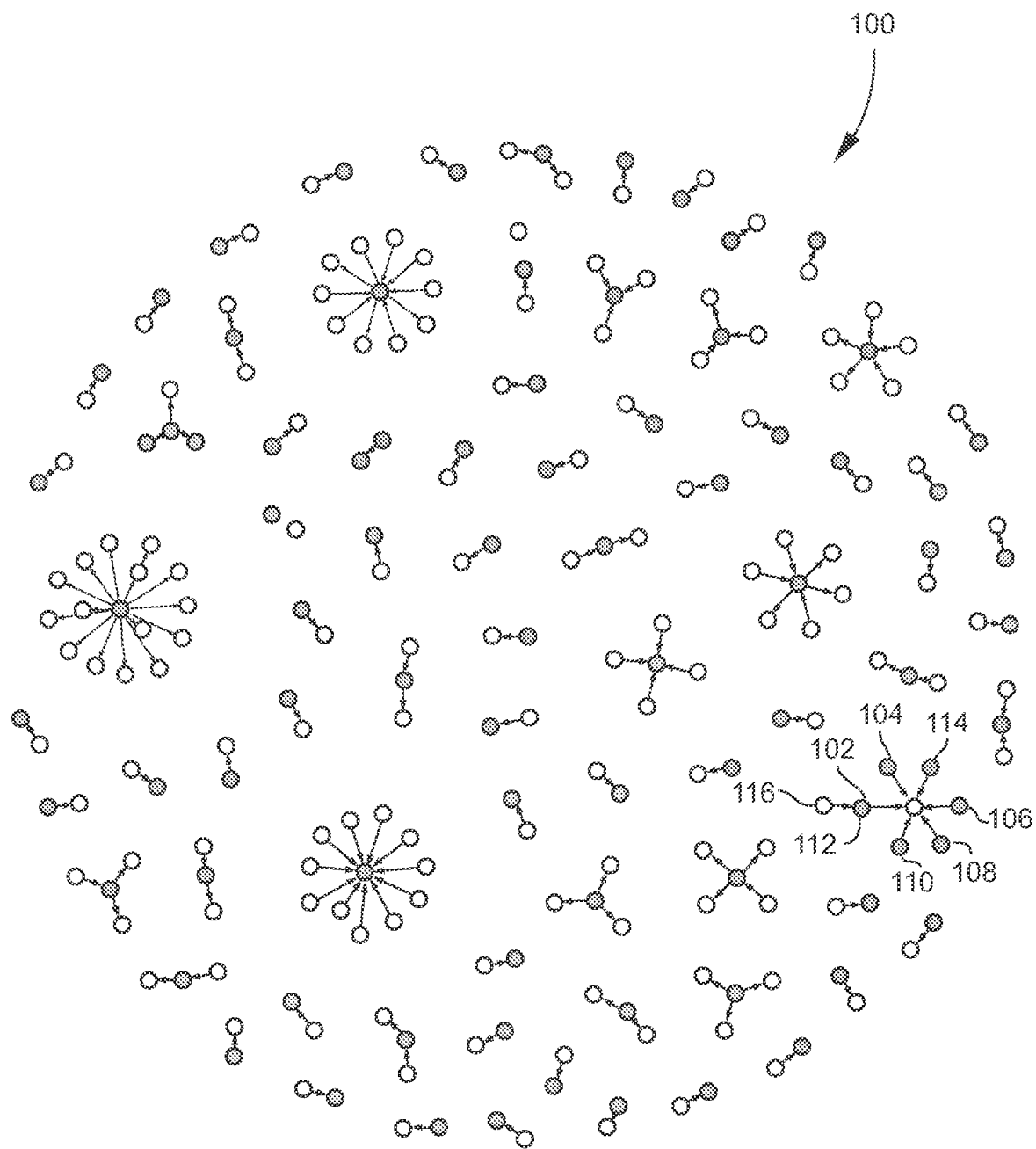
FIG. 1 illustrates an example of graphic visualization of a network of entities of interest based on transactions of those entities according to embodiments of the invention.

The present invention relates generally to the field of network analysis, modeling, and visualization, and more particularly to methods and systems for analyzing, modeling, and generating in a graphical user interface a visualization of electronic data related to behavior that may be associated, for example, with money laundering activities.

Current approaches to anti-money laundering (AML) may involve monitoring individuals and their financial transactions to detect anomalous behavior. Such approaches may include, for example, rule-based monitoring and peer group comparison. Rule-based monitoring may involve the use of scenarios and thresholds to monitor the behavior of clients, and peer group comparison may involve comparing an individual's behavior to that of the individual's peer group. An example of a commercially available AML solution which has been in use by financial institutions, such as banks, for a number of years is the MANTAS® product of ORACLE FINANCIAL SERVICES®, which may provide both rule-based monitoring and peer group monitoring.

These current methods may rely, for example, on aggregated transactional attributes at the customer or account level to create an 'alert' in the system. Such current methods may focus, for example, on cash, wire and check or other monetary instrument activity. In such methods, the cumulative activity over a certain period of time may be used to determine whether values are considered inside the norm or deviate from what is considered typical banking usage specific to a particular customer or account type. After a set of rules is run and alerts are created, analysts may be assigned to investigate the alerted activity and to determine whether or not the alerts represent a concern. When alerts demonstrate anomalous behavior or anomalous relationships with other entities that cannot be explained, a financial institution has a regulatory obligation to report the activity, for example, to the Financial Crimes Enforcement Network (FinCEN) via a suspicious activity report (SAR).

Although checking customer SAR history is an essential step during an investigation, this information is not used by any of the current alert generation rules in products, such as the MANTAS® product. Further, current investigation procedures require only that the research extends to parties present in alerted transactions, and no research is conducted on entities with whom such parties transact. In other words, current AML investigation procedures extend only one level deep, such as to an account, the account owner, and transactions with the account. Such transactions may include, for example, wire transfers into the account by other entities from other financial institutions with which the financial institution may have a counterparty relationship, but data available from such wire transfers may typically be very limited.

Thus, under current procedures, analysts are never presented with information about other direct or indirect connections which the entities of interest may have, and whether those connections are suspicious. Accordingly, relationships between such entities may be hidden from analysts because the 'larger picture' is not available in current investigation procedures. The resulting undetected anomalous connectivity patterns may represent a significant threat to the AML risk coverage of a financial institution, such as a bank.

There is a present need for a solution that resolves all of the foregoing issues and provides, for example, improved methods and systems for analysis, modeling, and graphical user interface visualizations of electronic data related to behavior that may be likely to be associated, for example, with money laundering activities that are not currently available.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention employ computer hardware and software, including, without limitation, one or more processors coupled to memory and non-transitory computer-readable storage media with one or more executable computer application programs stored thereon which instruct the processors to perform the network analysis, for example, in a selected group of customers and to analyze, model, and generate, in a graphical user interface, one or more visualizations of electronic data related to behavior, such as behavior that may be likely to be associated with money laundering activities.

As noted, undetected anomalous connectivity patterns that result from current AML investigations may represent a significant threat to the AML risk coverage of a financial institution, such as a bank. Embodiments of the invention employ network analysis, modeling, and electronic data visualization concepts to address and mitigate that risk. The network analysis, modeling, and data visualization techniques for embodiments of the invention enable a financial institution, for example, to identify and generate visualizations of relationships between entities, define communities of interest within networks, and analyze network growth patterns based on such visualizations. Such techniques for embodiments of the invention provide additional insights to the investigation process and identify linkages not detected by current procedures.

Such embodiments may involve, for example, receiving, using a processing engine computer having a processor coupled to memory, data elements related to a plurality of entities from one or more databases. The plurality of entities may comprise, for example, entities reported to authorities, entities reported to authorities as a result of a specific rule, including both individuals and commercial entities, as well as immediate parties found in the transactional data of such entities. Data elements received may encapsulate attributes related to these entities such as entity risk level, a history of reports to authorities, and type of entity (e.g., individual or commercial) in combination with transactional activity seen in a pre-defined period of time.

In further aspects of embodiments of the invention, received transactional activity data elements may be summarized at a customer level in order to simplify a granularity of observations and to accelerate the process of identifying the most relevant links. In a similar way, if more than one transaction is found between the same pair of entities, the relationship may be represented in terms, for example, of their aggregated values, total transactions amount and count, average time lag between transactions, and other relevant data. Following data retrieval, data results may be encoded as visual objects in a graphic display, an example of which is illustrated in FIG. 1.

FIG. 1 illustrates an example of a graphic visualization 100 of a network of entities of interest-based transactions of those entities according to embodiments of the invention. Referring to FIG. 1, each entity may be mapped as a unique node that retains the correspondent attributes of the entity that is represented by the node. Each node may be shown as an icon, such as a square or circle or some other suitable device. Referring to FIG. 1, entities that, for example, have been reported to authorities for unexplained anomalous behavior, such as entities 102, 104, 106, 108, 110, 112, may be represented in the visualization 100 by icons of a particular color or shape, and all other entities, such as entities 114, 116 may be represented by icons of a different color or shape. Further, transactions between entities may be represented in the visualization as links activated between nodes corresponding to the respective entities. Such links may be in the form, for example, of arrows that indicate a direction of flow of transactions between entities.

Figure 2:
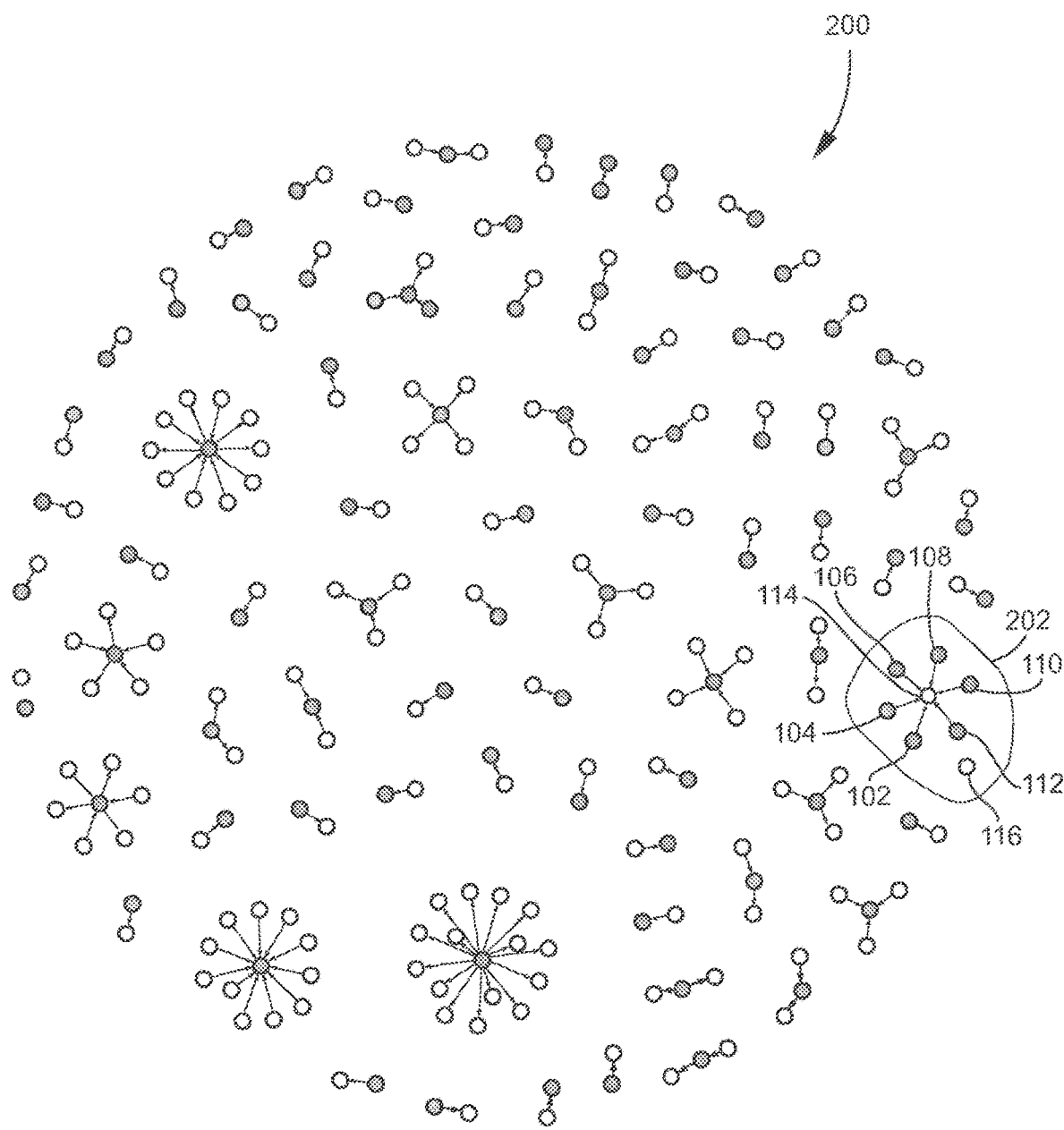
FIG. 2 illustrates an example a graphic visualization of a community of interest from the network of entities of interest of FIG. 1 according to embodiments of the invention.

As noted, an aspect of embodiments of the invention may involve, for example, identifying communities which are relevant, for example, to AML monitoring or merely identifying isolated components in the network of entities of interest 100 of FIG. 1. FIG. 2 illustrates an example of a graphic visualization of a community of interest 200 from the network of entities of interest 100. One or more community-finding algorithms may be employed in identifying such communities of interest. Examples of such algorithms may include, for example, WalkTrap, Infomap, Fast-Greedy, or Modularity, among others. Algorithms may be used interchangeably depending on time, complexity, and on adequate parameter selection. It is to be understood that the above-identified algorithms are examples only and that embodiments of the invention are not limited to employment of a particular algorithm or combination of algorithms.

As illustrated in FIG. 2, a result, for example, of one or more community finding-algorithms may be generation of a visualization of one or more distinguishable groups of closely connected entities, such as community 202. A community, such as community 202, may include, for example, entities 102, 104, 106, 108, 110, 112 shown in FIG. 1 that may be further analyzed individually. Each of the identified communities may be consecutively analyzed as a single new object, and new attributes may be derived from a network structure of the particular community, such as community 202, including, for example a total number of entities reported to authorities, a path length of flow of funds, and clustering and centrality measures.

Figure 3:
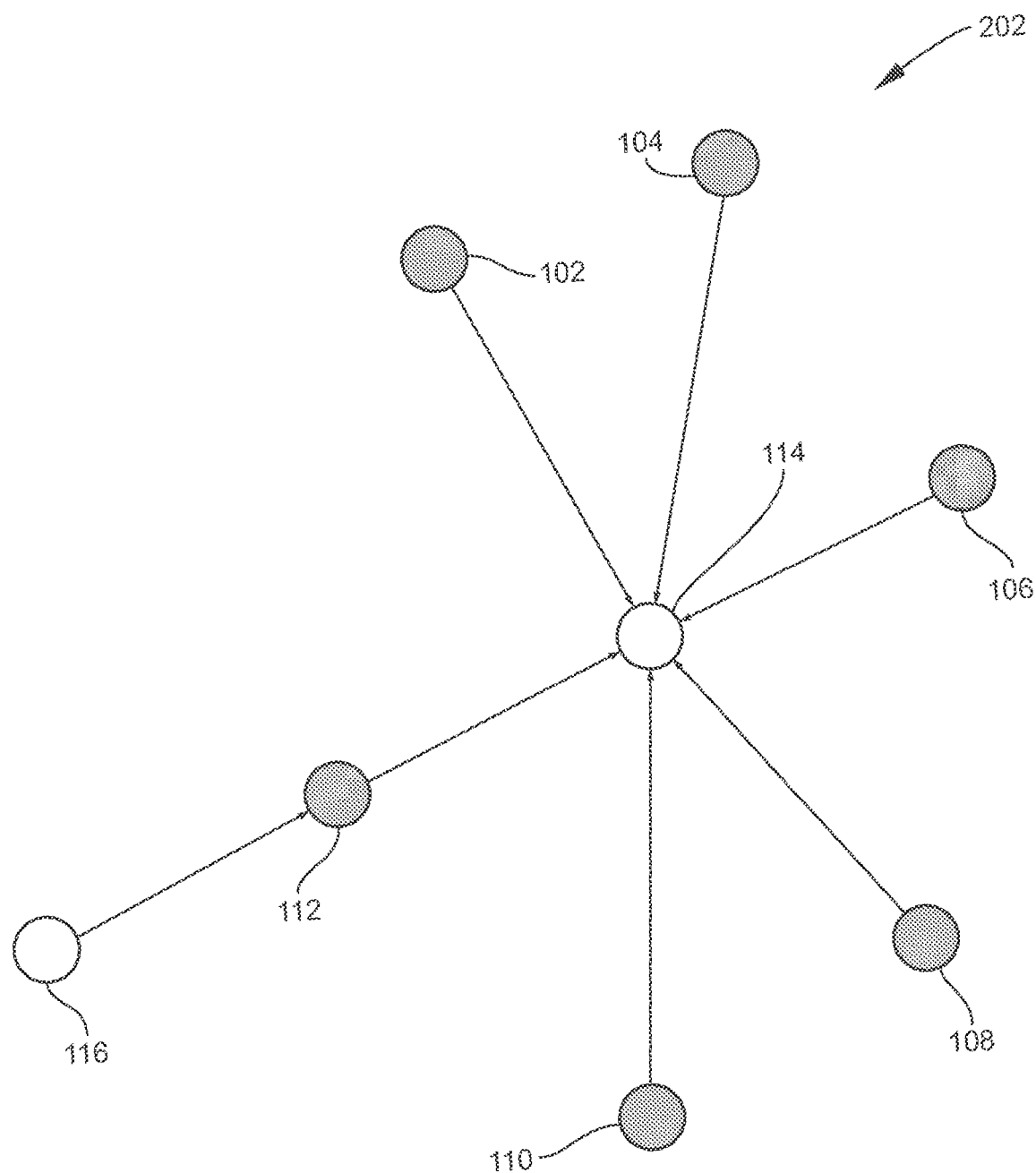
FIG. 3 illustrates an example of an expanded view a previously-identified community of interest in which entities and transaction details are also encoded and visualized according to embodiments of the invention.

FIG. 3 illustrates an example of an expanded view of a previously identified community of interest in which entities and transaction details are also encoded and visualized according to embodiments of the invention. The visualization of such community of interest may be discrete (i.e., separate and distinct). Moreover, visualizations of communities found may be generated, as illustrated in FIG. 3. Such visualizations may be further analyzed to explore the activity occurring within a set of entities. The transactional data details contained in the limits of the communities may also be encoded and included in such visualizations.

As noted, current procedures may not consider information about direct or indirect connections between parties who do not have histories of anomalous activities, such as entities 114, 116 in FIGS. 1-3, and other parties that have such histories, such as entities 102, 104, 106, 108, 110, 112 in FIGS. 1-3, which may result in undetected anomalous connectivity patterns that represent a significant AML risk. On the other hand, visualizations for embodiments of the invention may show, for example, connections between parties without a history of anomalous activity and other parties with a history of such activity that may uncover connectivity between such parties indicative of anomalous behavior.

As noted, the MANTAS® AML product of ORACLE FINANCIAL SERVICES® is an example of a rule-based AML monitoring product that is currently in use. The MANTAS® product, for example, employs scenarios (e.g., programs or applications) utilizing specific logic and algorithms to find anomalous behavior and may also employ thresholds and population segmentation to further tailor rules. Unfortunately, such scenarios generate far more non-productive alerts than productive ones, and extensive tuning and optimization is required to increase productivity. In addition, intensive analyst research is needed to identify patterns of anomalous behavior, and it is difficult to tell whether or not anomalous behavior is intentional.

As also noted, another current approach to AML monitoring is peer group analysis, in which all individuals (e.g., accounts and customers) are placed into groups with similar demographic and descriptive characteristics. An individual's behavior may then be compared to an average behavior of the individual's peer group, and anomalous individual behavior may be alerted for further research. Peer group analysis is dependent upon robust customer and account information, and a financial institution, such as a bank, may typically have a limited number of descriptors that can be used for defining peer groups. It is self-apparent that the fewer descriptors available, the broader the definition of a peer group may be. Thus, many non-productive alerts are likewise generated using peer group analysis.

Network analysis and visualization for embodiments of the invention may involve, for example, a determination of how entities, such as commercial and consumer accounts with a financial institution, interact with one another. A network may comprise the connections between such entities. Embodiments of the invention may employ, for example, visual components of link analysis to display connections between such entities. However, it is to be understood that network analysis for embodiments of the invention may differ from link analysis, which is a visual tool for displaying connections between entities and which involves neither modeling nor prediction of behavior. It is to be further understood that network analysis for embodiments of the invention may apply a multi-disciplinary statistical/mathematical approach for describing, modeling, and predicting connections within a network.

For example, in aspects of embodiments of the invention, periodically, such as monthly, cash transaction data may be analyzed with respect to amounts and transaction locations. Transactions which are executed, for example, at least a predetermined geographic distance from an address of an account holder may be flagged as worthy of further investigations. A customer number of the account holder may be selected, and a financial institution database may be searched for cases with the same customer number as those in the suspect cash transactions. A report may be generated which lists all the suspect customer numbers and any case numbers for the same customer. In addition, connections between entities representing flows of funds may be identified and a visualization, such as illustrated in the example of FIG. 4, may be generated.

Figure 4:
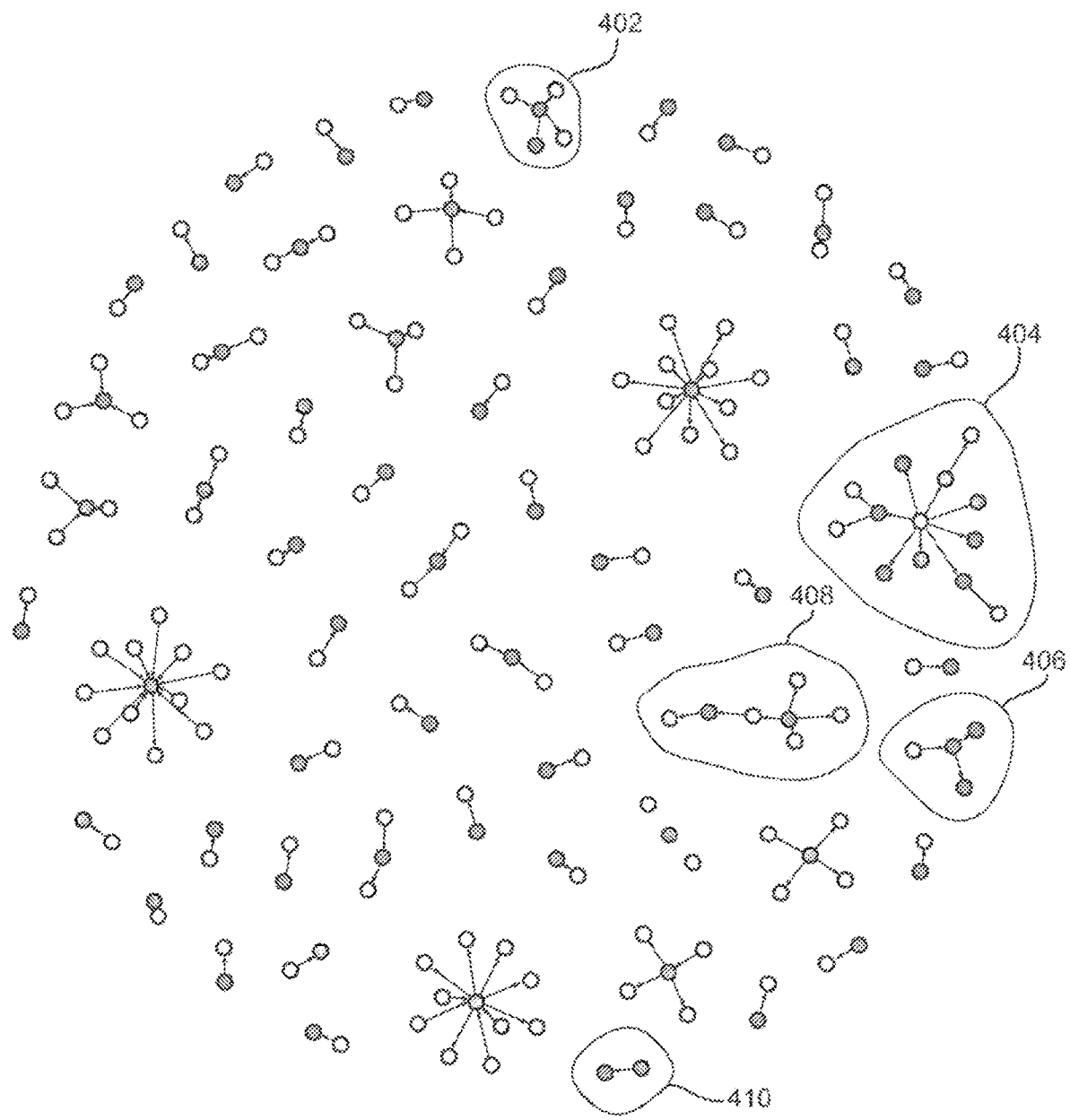
FIG. 4 illustrates an example of a graphic visualization of communities of entities defined by connections which the entities have to one another identified using automated network analysis for embodiments of the invention.

FIG. 4 illustrates an example of a graphic visualization of communities of entities defined by connections which the entities have to one another identified using automated network analysis for embodiments of the invention. Referring to FIG. 4, automated network analysis algorithms for embodiments of the invention may be employed to detect and visualize communities of entities defined by the connections that entities have to one another. Referring to FIG. 4, the visualization may include a relatively large number of connectors representing transactions between the entities. Further, anomalous connectivity patterns may be found in certain of the communities, such as the encapsulated entities forming communities 402, 404, 406, 408, 410.

Figure 5:
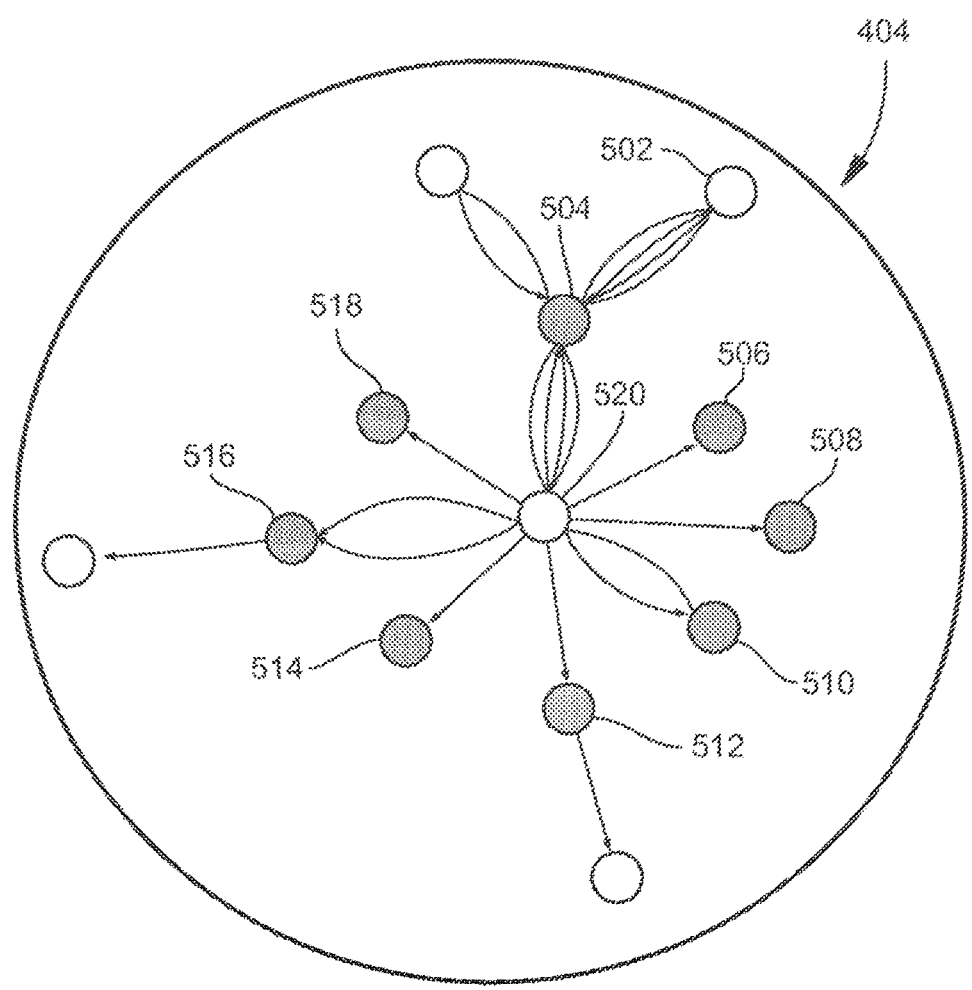
FIG. 5 illustrates an enlarged view of largest of the five encapsulated entities shown on the example visualization of FIG. 4.

FIG. 5 illustrates an enlarged view of largest of the five encapsulated entities shown on the example visualization of FIG. 4. Referring to FIG. 5, the visualization for embodiments of the invention may show, for example, connections between entities without a history of anomalous activity and other entities with a history of such activity that may uncover connectivity between such entities indicative of anomalous behavior. For example, multiple transactions sent by an entity without a history of anomalous activity, such as entity 502, to an entity with a history of such activity, such as entity 504, may merit investigation. For another example, multiple entities with a history of such activity, such as entities 504,506,508,510,512,514,516,518, transacting with an entity without a history of anomalous activity, such as entity 520, may likewise merit investigation. Moreover, an entity without a history of anomalous activity, such as entity 520, which is common to multiple entities with a history of such activity may merit a focused investigation.

Figure 6:
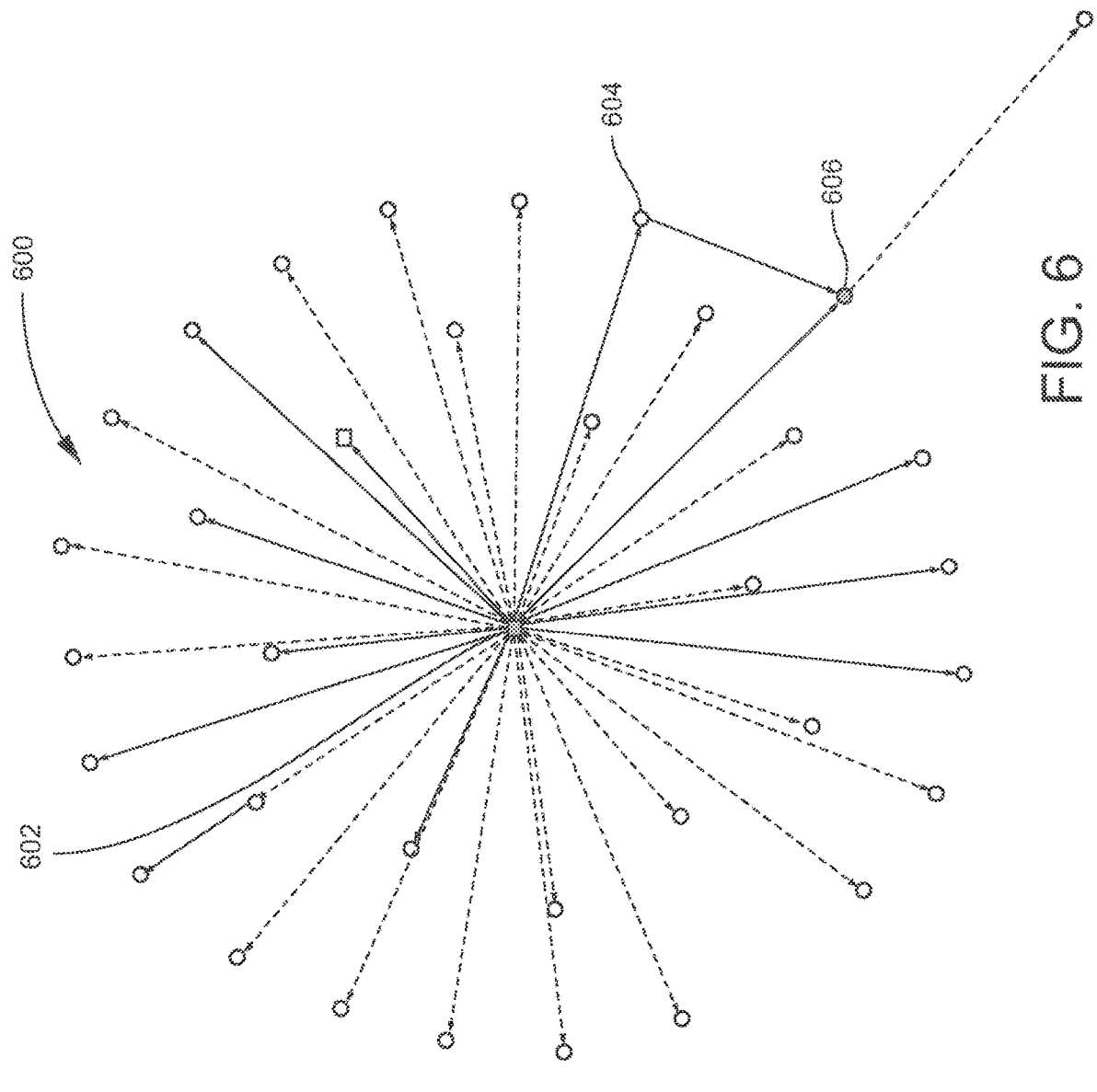
FIG. 6 illustrates an example of network analysis and visualization, according to embodiments of the invention, for an entity with a history of anomalous activity, such as a suspicious activity report.
Figure 6:
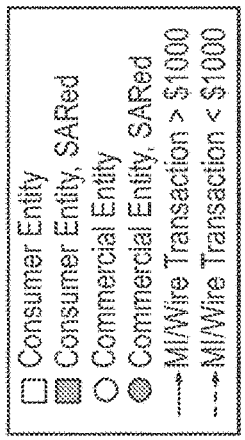

FIG. 6 illustrates an example of network analysis and visualization according to embodiments of the invention for an entity with a history of anomalous activity, such as a suspicious activity report. Referring to FIG. 6, for example, a visualization of a network of money movement between entities 600 may be generated. In such visualization, monetary instruments and wire transactions between entities may be aggregated as either less than or greater than $1000, and the entities may be identified as either the subject of a suspicious activity report or not the subject of such a report.

Embodiments of the invention enable actual visualization of the network and suspected money-laundering activity in which movement of money may suggest an intent to commit a crime. Referring to FIG. 6, the visualization of multiple transactions greater than $1,000 sent by a commercial entity with a history of anomalous activity, such as commercial entity 602, to multiple different consumers may merit investigation. Referring further to FIG. 6, the 'triangle' of transactions between commercial entity 602, a consumer with no history of anomalous activity, such as consumer 604, and a consumer with a history of anomalous activity, such as consumer 606, may suggest an existence of funneling activity and raise questions as to the role of consumer 604.

According to embodiments of the invention, networks have attributes that can be mathematically described, and the mathematic components may be used to analyze and visualize properties and characteristics the networks. These network properties define network models, which aid in understanding how a network may evolve and what the network may be expected to look like at a certain time.

Figure 7:
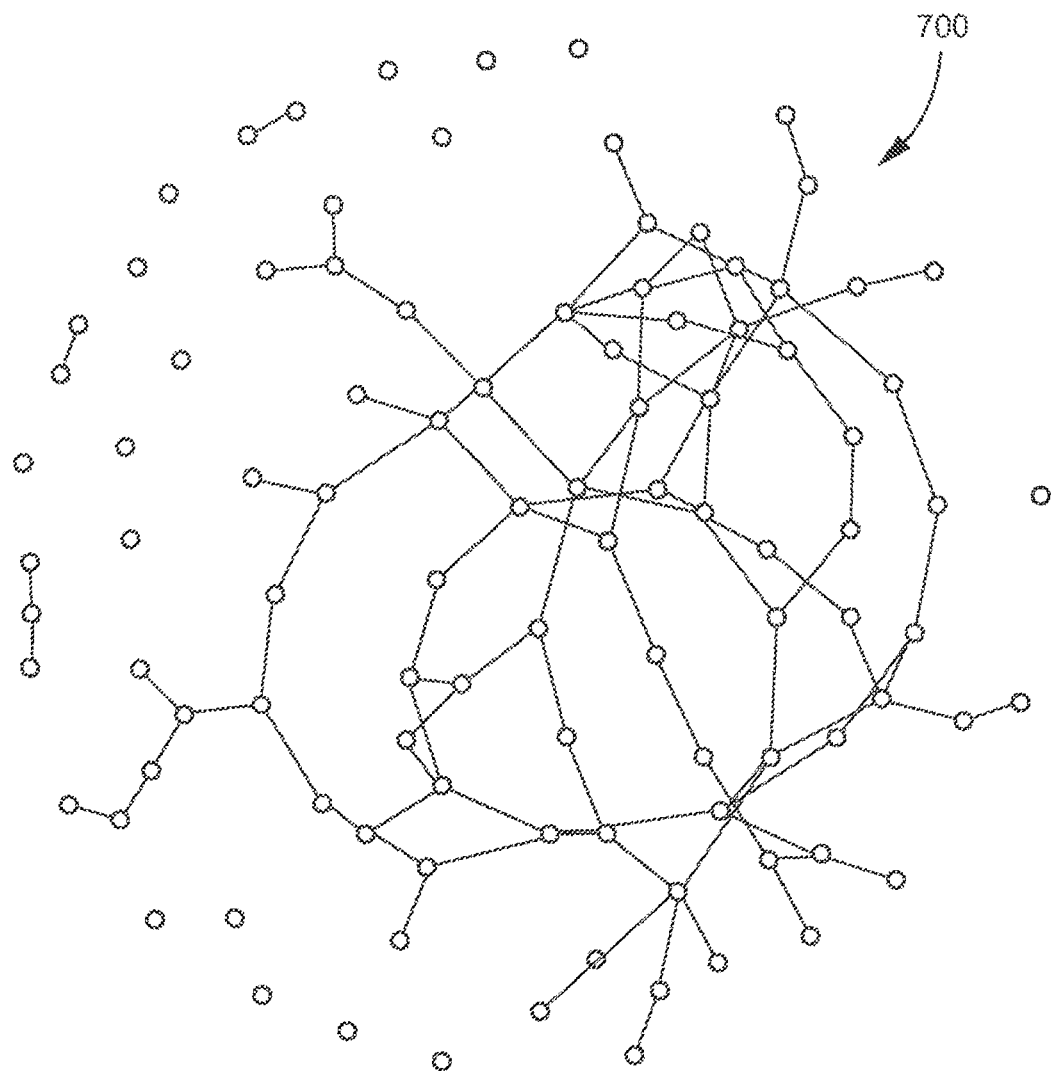
FIGS. 7 and 8 illustrate, respectively, examples of visualizations, according to embodiments of the invention, of a random network and a preferential attachment network.
Figure 8:
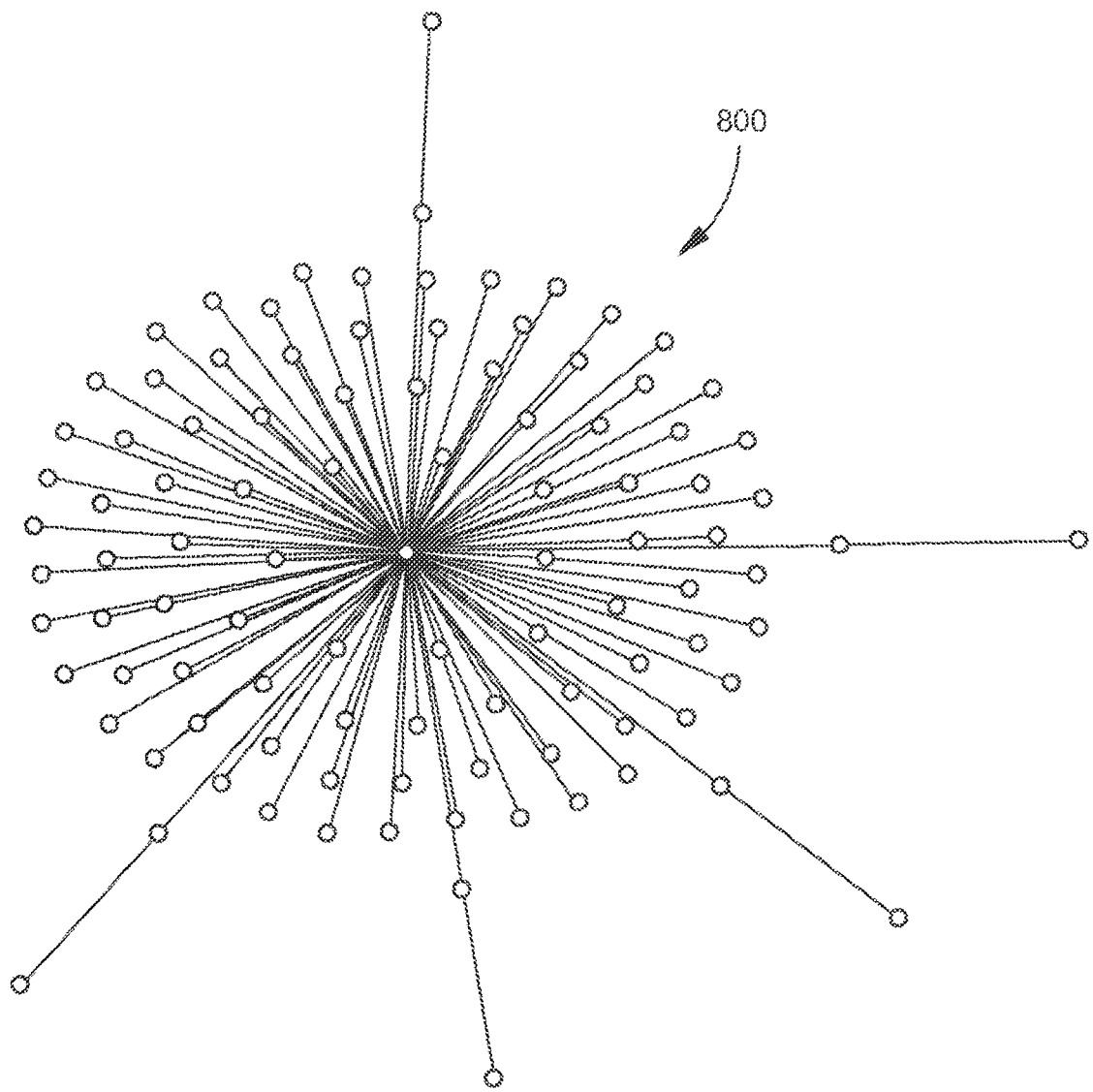

FIGS. 7 and 8 illustrate, respectively, examples of a random network 700 and a preferential attachment network 800, each having, for example, 100 entities and 99 connections. Referring to FIG. 7, the random network 700 may represent an example of a visualization of entities connecting to one another with little predicable logic. An example of such a random a network may be people meeting at random at a rock concert. On the other hand, referring to FIG. 8, the preferential network 800 may represent entities, each of whom is a fan seeking a connection with a preferred entity, such as a fan club president who is a personal friend of a star of a rock concert with backstage passes to distribute.

Network modeling elements for embodiments of the invention may include, for example, variables such as density, size, average degree, average path length, and clustering coefficient. The density variable may include, for example, a ratio of a number of connections to a number of possible connections in a network, and the size variable may include, for example, a number of entities in the network. The average degree variable may include, for example, a number of connections attached to the entity, and the average path length variable may include, for example, a number of steps required to get from one entity in the network to another. Finally, the clustering coefficient variable may include, for example, a measure of an 'all-my-friends-know-each-other' property, sometimes also described as 'friends-of-my-friends-are-my-friends'. More precisely, the clustering coefficient may be a ratio of existing connections attaching the neighbors of an entity to one another to a maximum possible number of such connections.

Figure 9:
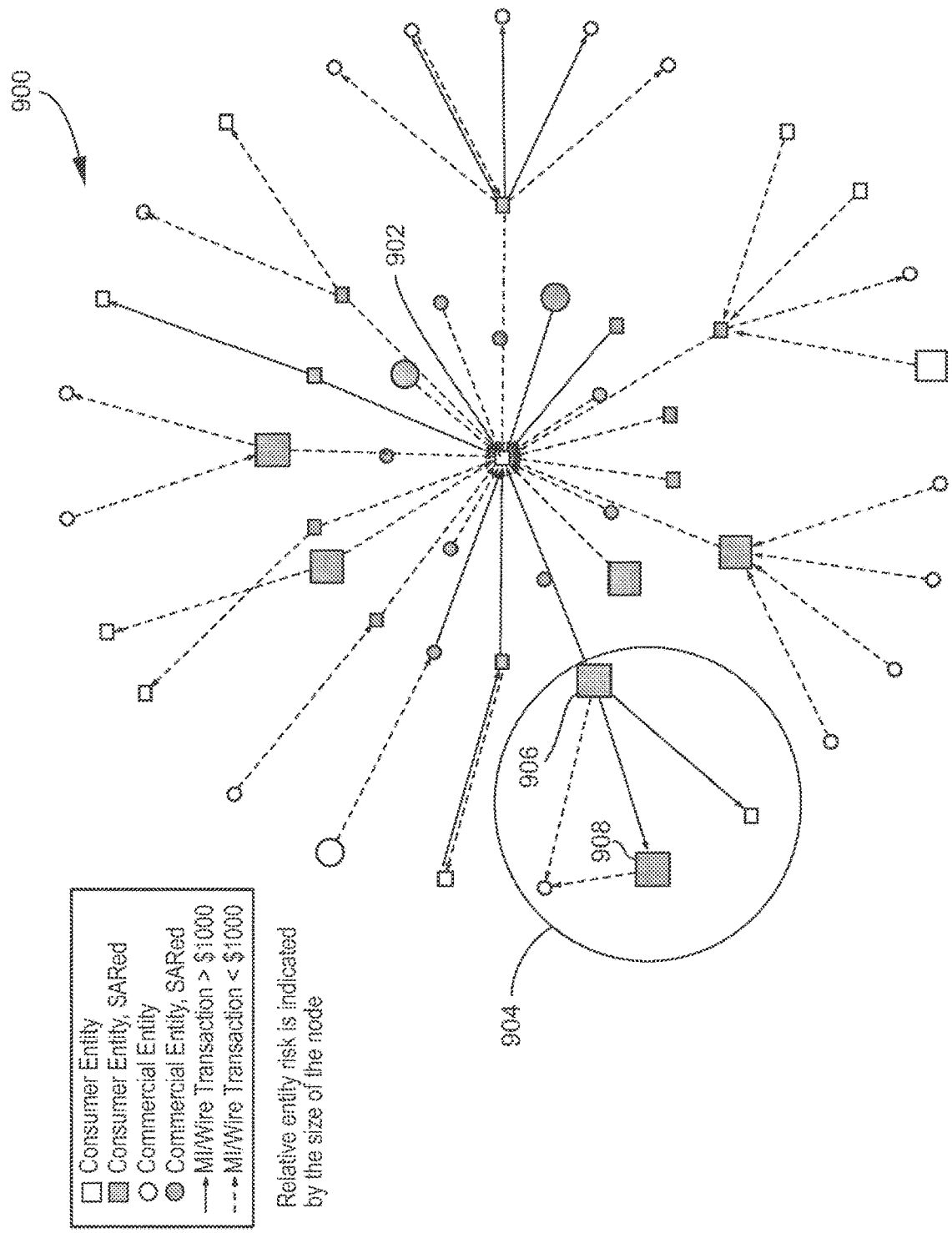
FIG. 9 illustrates an example of network analysis and visualization according to embodiments of the invention which reveals evidence of a high coefficient of clustering.

FIG. 9 illustrates an example of network analysis and visualization according to embodiments of the invention which reveals evidence of a high coefficient of clustering, also referred to as high local clustering between entities. Referring to FIG. 9, as before, monetary instruments and wire transactions between entities may be aggregated as either less than or greater than $1000, and the entities may be identified as either the subject of a suspicious activity report or not the subject of such a report. In addition, algorithms for embodiments of the invention may be employed to indicate the risk level of the entity and to visualize a size of node representing an entity as proportional to a level of risk associated with the entity.

Referring further to FIG. 9, it may be noted that the network visualization 900 discloses a significant number of commercial and non-commercial entities with histories of anomalous behavior transacting with a commercial entity 902 at the center of the network that does not have a history of anomalous behavior. It may likewise be noted that the network visualization 900 also discloses multiple non-commercial entities transferring money to a commercial entity with a history of anomalous behavior that may be an indication of funneling. Finally, it may be noted that the network visualization 900 also discloses the occurrence of high local clustering at 904 that may indicate a high probability that commercial entities 906, 908, both with a history of anomalous behavior, may transact in the future.

Figure 11:
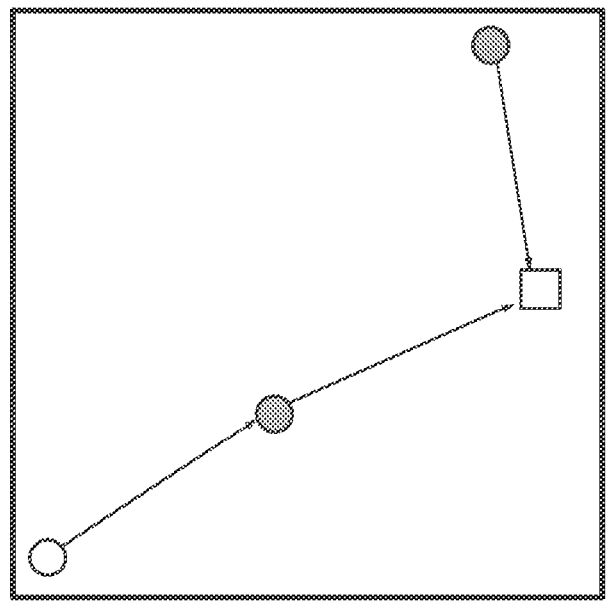
FIG. 11 illustrates an example of network analysis and visualization, according to embodiments of the invention, for the community of the case of FIG. 10.
Figure 11:
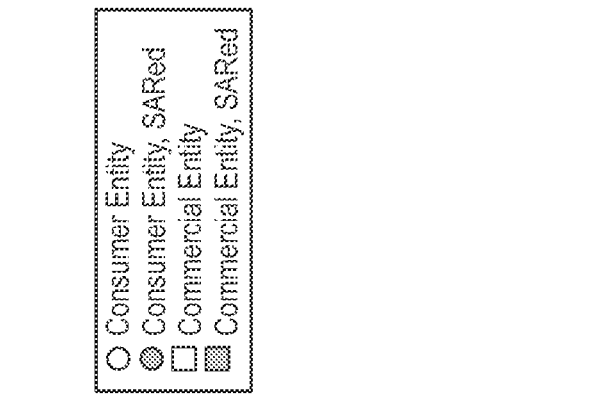
Figure 11:
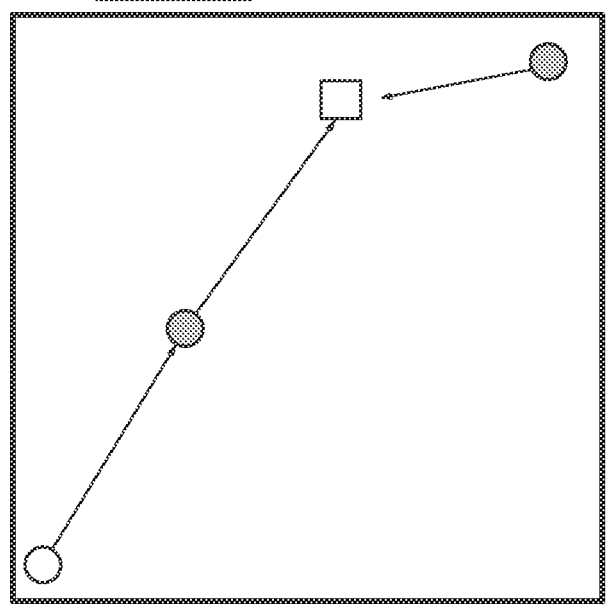

In embodiments of the invention, network attributes may have mathematical characteristics that may be employed as 'search arguments' to locate specific communities. For example, as shown in the example table of FIG. 10, a specific pattern may be found in data for a particular month for cases which were previously investigated and closed, and identical values may be found in data for two months later in such cases. Further, as shown in the example of FIG. 11, in network visualizations for these same two periods, the communities may have the same types of commercial and non-commercial entities, the same entities for which suspicious activity was reported, and flow of funds in the same directions. Thus, back-testing for embodiments of the invention may lead to a network metric definition for suspicious activity reports.

FIG. 12 is a flow chart that illustrates an overview example of the graphical user interface electronic data visualization process for embodiments of the invention. Referring to FIG. 12, at SI, one or more processors coupled to memory may generate, in a relationship visualization aspect of a graphical user interface, a visualization consisting at least in part of a plurality of icons, such as shown in each of FIGS. 1-8 and 11, each icon representing a transacting entity. At S2, the one or more processors may activate, in the relationship visualization aspect of the graphical user interface, a visualization consisting at least in part of an element, such as likewise shown in each of FIGS. 1-8 and 11, disposed between each of a plurality of pairs of said plurality of icons representing transactions between transacting entities. At S3, the one or more processors may encapsulate, in the relationship visualization aspect of the graphical user interface, a visualization of at least one community of icons consisting of at least a portion of said plurality of pairs of icons, such as shown in FIGS. 2 and 4, at least one member of said community of icons representing a transacting entity having a history of anomalous transactions.

As noted, in embodiments of the invention, network attributes can be mathematically described. Thus, the metrics for embodiments of the invention may be used, for example, to describe existing networks and to find all or parts of networks fitting a particular description. Further, metrics for embodiments of the invention may, for example, use modeling theory to help understand how networks may evolve. In addition, metrics for embodiments of the invention may be used, for example, to find high local clustering communities and predict how such communities may evolve and to find similar types of networks in different data sets.

In particular, in the realm of AML, the metrics for embodiments of the invention may be used, for example, to describe existing networks and to highlight potential suspicious behavior patterns, to find networks or parts of networks fitting a particular description, and to locate 'triangles' which may indicate funneling activity. Further, in the AML realm, the metrics for embodiments of the invention may use, for example, modeling theory to help understand how networks may evolve or how entities may evolve as 'preferential attachment entities' making them highly suspicious.

Additionally, in dealing with AML, the metrics for embodiments of the invention may be employed to find high local clustering communities and predict how such communities are likely to evolve. Further, the metrics for embodiments of the invention may be employed to determine, for example, if a 'friend of my friend' is also a suspicious entity. Moreover, the metrics for embodiments of the invention may be used in the AML realm to find similar types of networks in different data sets and to rapidly focus on behavior that is likely to result in a suspicious activity report.

Other aspects of embodiments of the invention may involve, for example, various display and graphical user interface components to enable selection and display of a specific network of interest, such as a network or community identified using network analysis metrics for embodiments of the invention. For example, such display and graphical user interface components may graphically depict key insights such as transaction amount and count reflected, for example, in a size, such as a length or width of a connection, and segmentation values reflected in a shape, such as a circle, star, or octagon, of a symbol or icon representing a network entity.

Further, such display and graphical user interface components for embodiments of the invention may graphically depict other key insights such as highlighting suspicious transaction patterns with symbols or icons, such as triangles or squares, and showing relative risks of entities and connections by depicting symbols or icons representing such entities and connections, for example, in sizes proportionate to a level of risk or colors in colors of an intensity proportionate to a level of risk.

It is to be understood that embodiments of the invention may be implemented as processes of a computer program product, each process of which is operable on one or more processors either alone on a single physical platform, such as a personal computer, a laptop computer, a smart phone, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and/or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

In addition, it is to be understood that client devices that may be employed by embodiments of the invention may also comprise a number of external or internal devices, such as a CD-ROM, DVD, touchscreen display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A system for identifying matching parameters of groups of nodes in graphical representations, the system comprising:

one or more processors communicatively coupled to a storage device, wherein the one or more processors execute instructions that are stored in the storage device to cause the system to:

receive, by the system and from a computing device associated with one or more financial institutions, records of transactions involving a first plurality of entities who have direct or indirect connections with a second plurality of entities who have histories of anomalous activities;

generate, using the records and in a graphical user interface, a first graphical representation of encoded data comprising encoded data parameters of each of a first plurality of users associated with the first plurality of entities, wherein the first plurality of users have both direct and indirect connections to one another and wherein a subset of the first plurality of users has detected anomalous interactions, wherein the first graphical representation comprises a first plurality of nodes corresponding to the first plurality of users, wherein each node represents an individual user and is encoded with data representing a plurality of risk-related or interaction-related parameters or attributes of the user;

activate, in the first graphical representation for each node, an icon which differentiates the parameters or attributes of one user from the parameters or attributes of another user in terms of anomalous behavior;

activate, in the first graphical representation, the encoded data as a first plurality of links connecting a first plurality of pairs of the first plurality of nodes, the first plurality of links representing interactions between respective users of the first plurality of users, wherein each link connects a single pair of users and is encoded with transactional details associated with the interactions between each pair of users;

identify, by the one or more processors and using a community-finding algorithm, at least one community of interest which is relevant to anomalous behavior, wherein each community comprises a grouping of nodes;

select at least one grouping of nodes which merits investigation and activate, in the first graphical representation, a visualization of each selected grouping;

activate, in the first graphical representation, a visualization of the interactions and transaction details within each grouping of nodes to allow analysis of the interactions relevant to anomalous behavior between users without a history of anomalous behavior and users with a history of anomalous behavior;

identify a level of local clustering for each grouping of a first plurality of groupings of the first plurality of nodes, wherein the level is indicative of anomalous behavior and is based on a ratio of a first number to a second number, the first number comprising a number of links connecting nodes of the grouping to at least one user of the grouping with the detected anomalous interactions, the second number comprising a maximum possible number of links connecting the nodes of the grouping to one another;

detect, based on the level of local clustering identified for each grouping, a first grouping of the first plurality of groupings for which a corresponding level of local clustering satisfies a predetermined level of local clustering indicative of undesired activity;

determine, for a portion of the first graphical representation corresponding to the first grouping, one or more graphical parameters relating to the corresponding level of local clustering;

receive, via the graphical user interface, a user selection of a second grouping within a second plurality of groupings of a second plurality of nodes within a second dataset associated with a second graphical representation;

in response to receiving the user selection, generate, in the graphical user interface, the second graphical representation of the second grouping;

identify, in the second grouping, the one or more graphical parameters matching the first grouping; and generate, on the second graphical representation, visual indicators of the one or more graphical parameters matching the first grouping, the visual indicators indicating that the second grouping requires further analysis.

2. The system of claim 1, wherein at least one node of each grouping represents a user associated with prior user data comprising anomalous interactions.

3. The system of claim 1, wherein at least one node of each grouping of the first plurality of groupings represents a user associated with prior user data comprising a report to a governmental authority for suspected unlawful activity.

4. The system of claim 3, wherein each user associated with the prior user data comprising the report is represented by a node having a different appearance from an appearance of nodes representing other users identified in an interaction with the user associated with the prior user data comprising the report.

5. The system of claim 4, wherein the different appearance indicates a level of risk associated with the user associated with the prior user data comprising the report.

6. The system of claim 1, wherein the encoded data comprises encoded interaction data parameters of each of the first plurality of users.

7. The system of claim 6, wherein the encoded interaction data parameters of each of the first plurality of users correspond to a pre-defined period of time.

8. The system of claim 6, wherein the encoded interaction data parameters are summarized for each user.

9. The system of claim 6, wherein the encoded interaction data parameters of each of the first plurality of users relate to a plurality of interactions with other users of the first plurality of users.

10. The system of claim 9, wherein the encoded interaction data parameters related to the plurality of interactions comprise encoded interaction data elements representing an aggregated value of the plurality of interactions, a total interaction amount and count for the plurality of interactions, and an average time lag between interactions.

11. The system of claim 1, wherein each link of the first plurality of links indicates a direction of flow of an interaction between a corresponding pair of the first plurality of pairs of the first plurality of nodes.

12. The system of claim 11, wherein each link indicating the direction of flow of the interaction between the corresponding pair comprises an arrow indicating the direction.

13. The system of claim 1, wherein each link of the first plurality of links has an appearance indicating a transaction amount and a count of transactions between a corresponding pair of the first plurality of pairs of the first plurality of nodes.

14. The system of claim 13, wherein the appearance comprises a size indicating the transaction amount and the count of transactions between the corresponding pair of the first plurality of pairs of the first plurality of nodes.

15. The system of claim 1, wherein each link of the first plurality of links has an appearance indicating a level of risk of unlawful activity associated with each interaction between a corresponding pair of the first plurality of pairs of the first plurality of nodes.

16. A method comprising:

receiving, from a computing device associated with one or more financial institutions, records of transactions involving a first plurality of entities who have direct or indirect connections with a second plurality of entities who have histories of anomalous activities;

generating, using the records and in a graphical user interface, a first graphical representation of encoded data comprising encoded data parameters of each of a first plurality of users associated with an the first plurality of entities, wherein the first plurality of users have both direct and indirect connections to one another and wherein a subset of the first plurality of users has detected anomalous interactions, wherein the first graphical representation comprises a first plurality of nodes corresponding to the first plurality of users, wherein each node represents an individual user and is encoded with data representing a plurality of risk-related or interaction-related parameters or attributes of the user;

activating, in the first graphical representation for each node, an icon which differentiates the parameters or attributes of one user from the parameters or attributes of another user in terms of anomalous behavior;

activating, in the first graphical representation, the encoded data as a first plurality of links connecting a first plurality of pairs of the first plurality of nodes, the first plurality of links representing interactions between respective users of the first plurality of users, wherein each link connects a single pair of users and is encoded with transactional details associated with the interactions between each pair of users;

identifying, using a community-finding algorithm, at least one community of interest which is relevant to anomalous behavior, wherein each community comprises a grouping of nodes;

selecting at least one grouping of nodes which merits investigation and activating, in the first graphical representation, a visualization of each selected grouping;

activating, in the first graphical representation, a visualization of the interactions and transaction details within each grouping of nodes to allow analysis of the interactions relevant to anomalous behavior between users without a history of anomalous behavior and users with a history of anomalous behavior;

identifying a level of local clustering for each grouping of a first plurality of groupings of the first plurality of nodes, wherein the level is indicative of anomalous behavior and is based on a ratio of a first number to a second number, the first number comprising a number of links connecting nodes of the grouping to at least one user of the grouping with the detected anomalous interactions, the second number comprising a maximum possible number of links connecting the nodes of the grouping to one another;

detecting, based on the level of local clustering identified for each grouping, a first grouping of the first plurality of groupings for which a corresponding level of local clustering satisfies a predetermined level of local clustering indicative of undesired activity;

determining, for a portion of the first graphical representation corresponding to the first grouping, one or more graphical parameters relating to the corresponding level of local clustering;

receiving, via the graphical user interface, a user selection of a second grouping within a second plurality of groupings of a second plurality of nodes within a second dataset associated with a second graphical representation;

in response to receiving the user selection, generating, in the graphical user interface, the second graphical representation of the second grouping;

identifying, in the second grouping, the one or more graphical parameters matching the first grouping; and generating, on the second graphical representation, visual indicators of the one or more graphical parameters matching the first grouping, the visual indicators indicating that the second grouping requires further analysis.

17. The method of claim 16, wherein at least one node of each grouping represents a user associated with prior user data comprising a report to a governmental authority for suspected unlawful activity, and wherein each user associated with the prior user data comprising the report is represented by a node having a different appearance from an appearance of nodes representing other users identified in an interaction with the user associated with the prior user data comprising the report.

18. The method of claim 16, wherein the encoded data comprises encoded interaction data parameters of each of the first plurality of users, the encoded interaction data parameters relating to a plurality of interactions with other users of the first plurality of users, wherein the encoded interaction data parameters comprise encoded interaction data elements representing an aggregated value of the plurality of interactions, a total interaction amount and count for the plurality of interactions, and an average time lag between interactions.

19. The method of claim 16, wherein each link of the first plurality of links indicates a direction of flow of an interaction between a corresponding pair of the first plurality of pairs of the first plurality of nodes and has an appearance indicating a transaction amount and a count of transactions between the corresponding pair.

20. One or more non-transitory, computer-readable media storing instructions that, when executed by one or more processors, cause operations comprising:

receiving, from a computing device associated with one or more financial institutions, records of transactions involving a first plurality of entities who have direct or indirect connections with a second plurality of entities who have histories of anomalous activities;

generating, using the records and in a graphical user interface, a first graphical representation of encoded data comprising encoded data parameters of each of a first plurality of users associated with an the first plurality of entities, wherein the first plurality of users have both direct and indirect connections to one another and wherein a subset of the first plurality of users has detected anomalous interactions, wherein the first graphical representation comprises a first plurality of nodes corresponding to the first plurality of users, wherein each node represents an individual user and is encoded with data representing a plurality of risk-related or interaction-related parameters or attributes of the user;

activating, in the first graphical representation for each node, an icon which differentiates the parameters or attributes of one user from the parameters or attributes of another user in terms of anomalous behavior;

activating, in the first graphical representation, the encoded data as a first plurality of links connecting a first plurality of pairs of the first plurality of nodes, the first plurality of links representing interactions between respective users of the first plurality of users, wherein each link connects a single pair of users and is encoded with transactional details associated with the interactions between each pair of users;

identifying, using a community-finding algorithm, at least one community of interest which is relevant to anomalous behavior, wherein each community comprises a grouping of nodes;

selecting at least one grouping of nodes which merits investigation and activate, in the first graphical representation, a visualization of each selected grouping;

activating, in the first graphical representation, a visualization of the interactions and transaction details within each grouping of nodes to allow analysis of the interactions relevant to anomalous behavior between users without a history of anomalous behavior and users with a history of anomalous behavior;

identifying a level of local clustering for each grouping of a first plurality of groupings of the first plurality of nodes, wherein the level is indicative of anomalous behavior and is based on a ratio of a first number to a second number, the first number comprising a number of links connecting nodes of the grouping to at least one user of the grouping with the detected anomalous interactions, the second number comprising a maximum possible number of links connecting the-nodes of the grouping to one another;

detecting, based on the level of local clustering identified for each grouping, a first grouping of the first plurality of groupings for which a corresponding level of local clustering satisfies a predetermined level of local clustering indicative of undesired activity;

determining, for a portion of the first graphical representation corresponding to the first grouping, one or more graphical parameters relating to the corresponding level of local clustering;

receiving, via the graphical user interface, a user selection of a second grouping within a second plurality of groupings of a second plurality of nodes within a second dataset associated with a second graphical representation;

in response to receiving the user selection, generating, in the graphical user interface, the second graphical representation of the second grouping;

identifying, in the second grouping, the one or more graphical parameters matching the first grouping; and generating, on the second graphical representation, visual indicators of the one or more graphical parameters matching the first grouping, the visual indicators indicating that the second grouping requires further analysis.

* * * * *